United States Patent [19]

Treadway

[11] Patent Number: 4,670,821

[45] Date of Patent: Jun. 2, 1987

[54] SHOCK RESISTANT LIGHT FOR MIG WELDER

[76] Inventor: John E. Treadway, 6718 Colony Acres Dr., St. Louis, Mo. 63123

[21] Appl. No.: 817,457

[22] Filed: Jan. 9, 1986

[51] Int. Cl.4 ............................................. F21V 33/00
[52] U.S. Cl. ................................... 362/109; 362/263; 362/418; 362/232; 362/347
[58] Field of Search ............... 362/109, 213, 232, 372, 362/263, 341, 347, 264, 345, 396, 418, 421, 429, 257, 263, 183; 219/230, 233, 236, 121 ES, 138

[56] References Cited

U.S. PATENT DOCUMENTS

| | | | |
|---|---|---|---|
| 2,333,192 | 11/1943 | Moberg | 219/138 |
| 2,388,474 | 11/1945 | Ellis | 362/109 |
| 3,316,385 | 4/1967 | Anton | 219/236 |
| 3,743,380 | 7/1973 | Fugitt | 362/109 |
| 3,778,610 | 12/1973 | Wolf | 362/418 |
| 3,900,727 | 8/1975 | Hutz | 362/263 |
| 4,150,422 | 4/1979 | Peralta et al. | 362/263 |
| 4,186,432 | 1/1980 | Hamacher | 362/263 |
| 4,204,699 | 7/1980 | Bredtschneider | 219/138 |
| 4,358,661 | 11/1982 | Kaderabek | 219/230 |
| 4,403,276 | 9/1983 | Blaisdell | 362/263 |
| 4,517,630 | 5/1985 | Dieffenbach et al. | 362/397 |
| 4,533,984 | 8/1985 | Gatton | 362/232 |
| 4,542,447 | 5/1984 | Quackenbush | 362/183 |

Primary Examiner—Raymond A. Nelli
Attorney, Agent, or Firm—Glenn K. Robbins

[57] ABSTRACT

A light for MIG welders. The light is provided by a low voltage high intensity halogen lamp and parabolic reflector to focus the concentrated light beam on the work area at an intensity comparable to that of the welding arc to provide visibility through the user's shield. The light is provided with a clamp for ready attachment to the welding gun and has an adjustment for shifting the focus with a toggle and spring biased shock resistance. To resist thermal shock a pyrex lens may be employed or a tungsten screen which further resists spatter. Ventilation is provided by openings in the reflector and the tungsten screen.

9 Claims, 3 Drawing Figures

SHOCK RESISTANT LIGHT FOR MIG WELDER

BACKGROUND OF THE INVENTION

In MIG welding there has existed a severe visibility problem. In such welding a darker, more dense light shield or filter is employed in the user's helmet than in conventional oxyacetylene welding and the user's vision around the peripheral area of the arc weld is badly impaired.

After the weld has been completed the user is required to use his free hand to lift the shield to provide visibility to orient himself and the gun with the workpiece. This operation is awkward and prevents the user from using the hand to steady the workpiece or otherwise aid in the welding operation.

Headlights for the user's helmet and auxiliary lights have been proposed which employ a shield in the user's helmet. Such lights have been difficult to focus on the work and have been more suitable for bench welding than in difficult accessible areas such as encountered in auto body repair. There has not been found to be available a light for attachment to a MIG gun that can provide the high intensity light needed and provide the thermal and physical shock resistance and focusing required in the welding operation.

SUMMARY OF THE INVENTION

By means of this invention there has been provided a high intensity light that can be readily attached to a MIG gun to provide focus adjustment coupled with thermal and physical shock resistance.

The light employs a low-voltage quartz halogen lamp bulb which has a relatively long life coupled with the thermal resistance to sudden change in temperature that may be encountered in the welding operation and the shock resistance needed for protection against accidental physical impact. A compact parabolic reflector allows close focus of concentrated light upon the work area and provides high intensity of reflected visible light through the user's light shield.

In order to provide additional protection for the quartz bulb, a metallic screen lens may be employed, preferably of tungsten. This provides protection against molten metal spatter to the bulb. A pyrex glass lens may also be employed where thermal shock to the bulb is a problem.

The power source to provide the low-voltage necessary, such as 12 volts, for example, may be provided by plug into an electric source and use of a transformer. Alternatively, the transformer employed in the MIG welder may be used by appropriate tapping of the transformer winding.

Attachment to the MIG gun is readily provided by a clamp which fits around the gun barrel. Tightening is effected by a thumb screw or the like.

Shock resistance and directing of the light upon the work area is provided by a spring biased swivel base. By the use of a toggle structure a universal type movement is provided with respect to the gun for a wide degree of adjustment of the light beam. The spring structure is enclosed in a swivel tube-like barrel to provide protection and also a convenient base or handle to grasp and position the light.

The high intensity concentrated beam provided by the compact light is of comparable intensity to that provided by the welding arc. It efficiently illuminates the work area while being viewed through the helmet shield. It may be used while welding or between welds in preparation or location of the next weld.

The light fixture is rugged in construction and readily attachable to various types of MIG guns. The employment in the welding operation is simple and effective.

The above features are objects of this invention. Further objects will appear in the detailed description which follows and will be further apparent to those skilled in the art.

For the purpose of illustration of this invention, preferred embodiments thereof are shown in the accompanying drawing. It is to be understood that the drawing is for purpose of description only and that the invention is not limited thereto.

IN THE DRAWING

DESCRIPTION OF THE INVENTION

Figure 1:
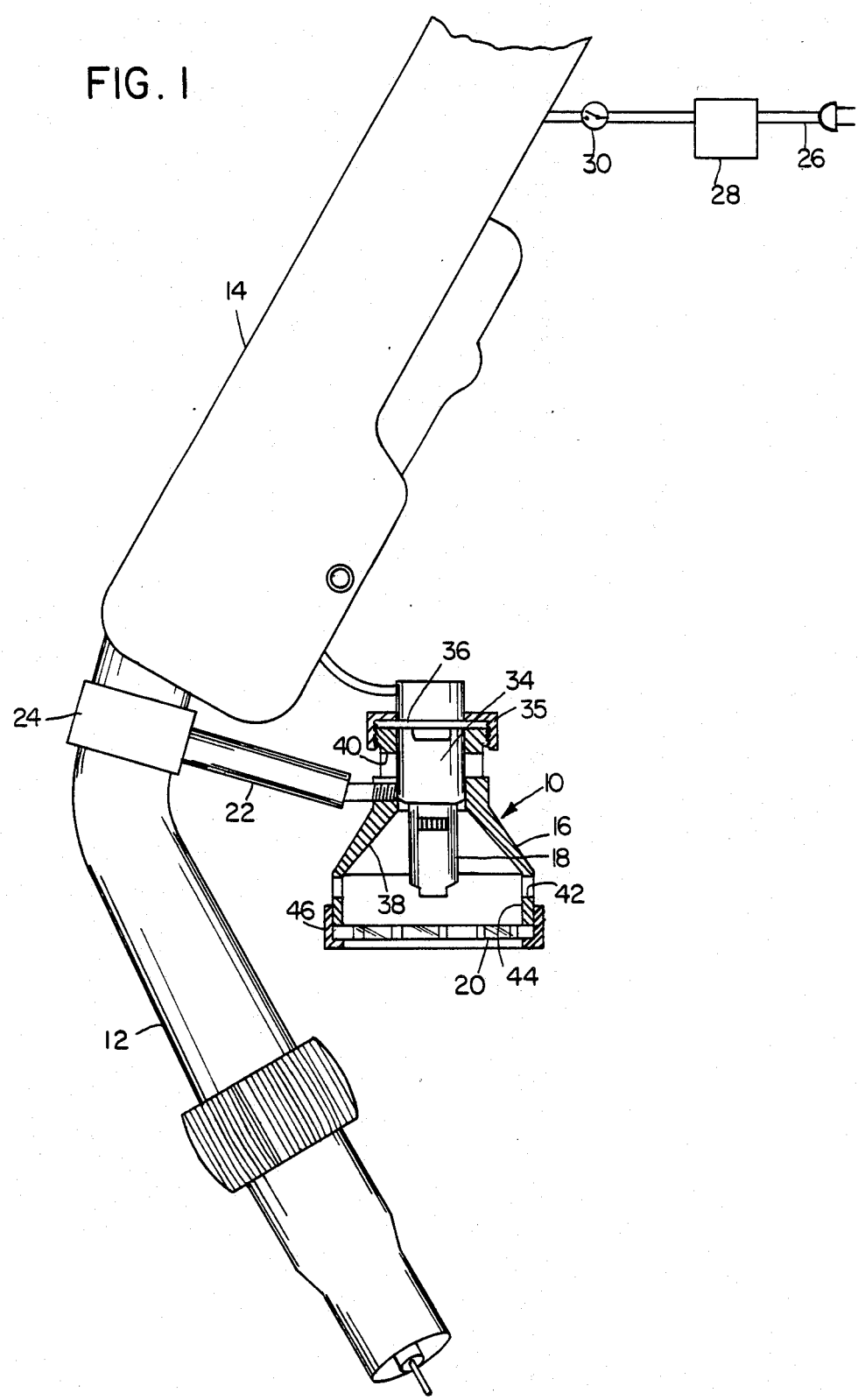
FIG. 1 is a view in side elevation showing a MIG welder equipped with the light of this invention shown partly in section.

The MIG welding light of this invention is generally indicated by the reference numeral 10 and is shown in FIG. 1 attached to the barrel 12 of a MIG gun 14.

The light is comprised of a parabolic reflector 16 which mounts on a quartz halogen bulb 18 and a lens 20. The reflector is connected to a shock absorbing swivel base 22 which in turn is connected to a clamp 24 which is fitted to the barrel of the gun. The power source is provided by a plug in electric line 26 and on-off switch 30. It will be understood that the transformer used in the conventional MIG welder may also be employed by appropriate tapping of the winding as will be well understood.

The quartz halogen bulb is a low voltage type, typically 12 volt for example, and generates a high intensity light comparable to that created in the MIG welding operation. The extremely bright light is needed to provide visibility through the dark #10 shield employed in the user's helmet for protection to the eye against the arc. The bulb, as an example, may be that manufactured by USHIO of Japan having 55 or 100 watts rating with a luminous flux of 1,540 Lm and 2,300 Lm, respectively. These bulbs have a stable light intensity distribution and the intensity is easy to regulate by the small parabolic reflector.

The quartz halogen lamp is particularly useful in the MIG welding operation since the quartz glass envelope is much more resistant to thermal shock than ordinary incandescent bulbs. Such lamps are resistant to breakage even upon contact with cold water. The halogen cycle in such bulbs provides a long life by repetition of evaporation of tungsten from the heated filament and reaction with the iodine halogen to produce tungsten iodide particles near the bulb wall. These particles circulate and decompose when approaching the highly heated filament into tungsten and iodine and the cycle is repeated. The bulbs are a fraction of the size of ordinary incandescent bulbs, e.g., approximately 1/200th the size, which makes possible a practical light of high intensity and small size.

Figure 2:
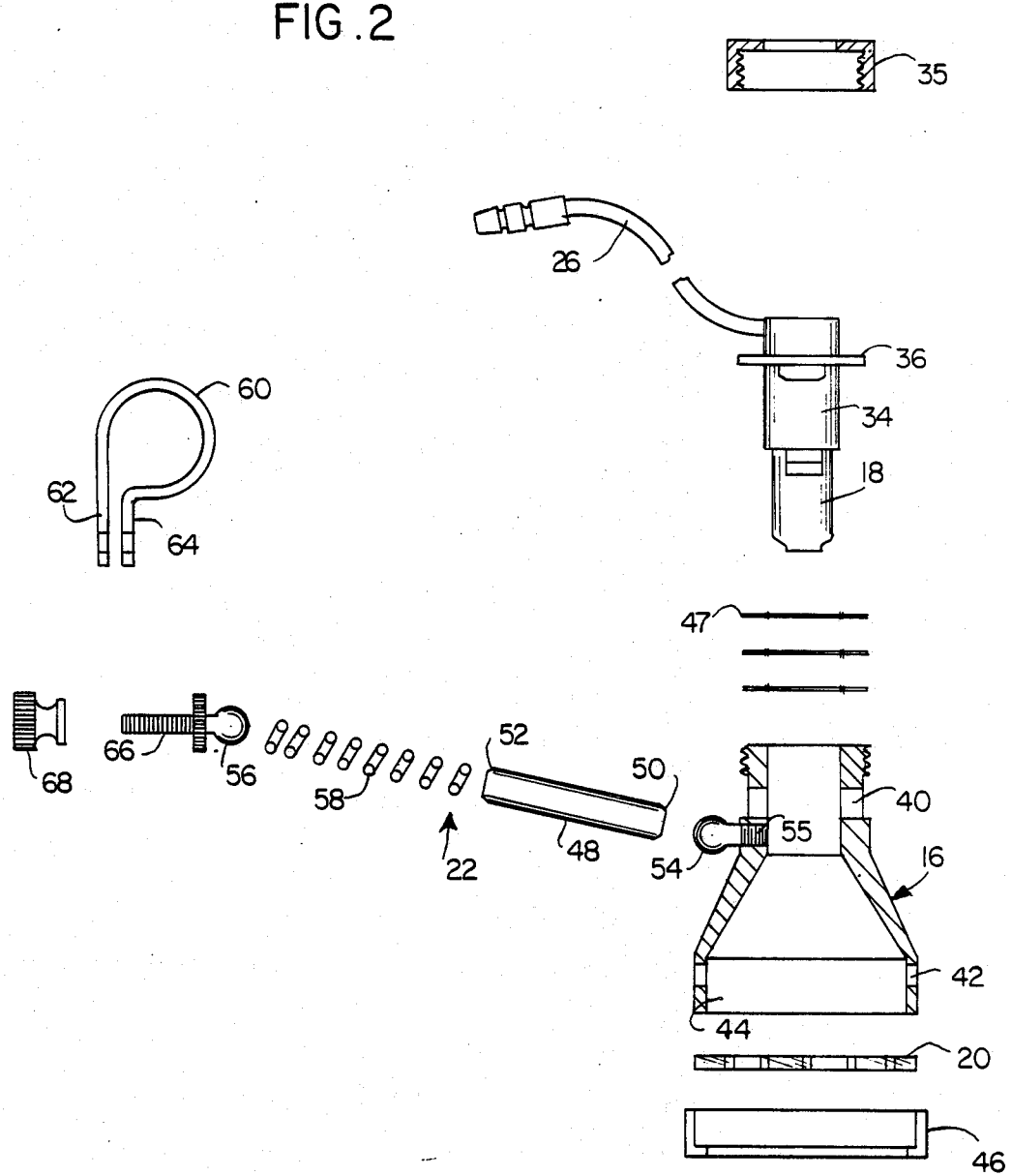
FIG. 2 is an exploded view showing the parts of the lights in section.

The mounting of the bulb 18 in the parabolic reflector 16 is well shown in FIG. 1 and the exploded view of the parts in FIG. 2. The reflector has a socket 32 receiving the base 34 of the bulb. A threaded end cap 35 clamps a flange 36 of the bulb tightly against the reflector or socket. The reflector may desirably be constructed of aluminum for light weight, strength and reflectivity of the internal polished parabolic reflecting surface 38. This surface will be understood to be of conventional form although for simplicity in drawing, it is shown to be conical. For dissipation of heat, vent holes 40 may be provided in the socket and additional holes 42 in a lens supporting shroud 44.

The lens 20 is shown in FIG. 1 as supported against the shroud 44 by a lens cap 46. The cap may be press-fitted against the shroud or a threaded engagement may be provided as for the previously described end cap 35. The lens 20 is shown in the form of a punched out screen of tungsten. It will also be understood that a woven screen of tungsten may be employed. Other metals such as stainless steel which resist adherence of spattered metal may also be employed. The mesh size may for example be in the 30–50 range. The tungsten provides light weight and protection against spattering. The openings also serve to provide ventilation and venting of heat from the light intensity bulb. While the screen is shown in punched out form, a woven screen may also be employed. Where thermal shock to the bulb is a problem, pyrex glass which has resistance to thermal shock may be employed.

In order to provide for appropriate focusing of the bulb within the parabolic reflector adjusting shims 47 are employed. These shims as shown in FIG. 2 are disc-like in structure as in a washer and are fitted around the bulb base 34 against the flange 36. The shims may be used in a selected amount to vary the centering of the bulb to provide a sharply focused or divergent beam as desired.

Figure 3:
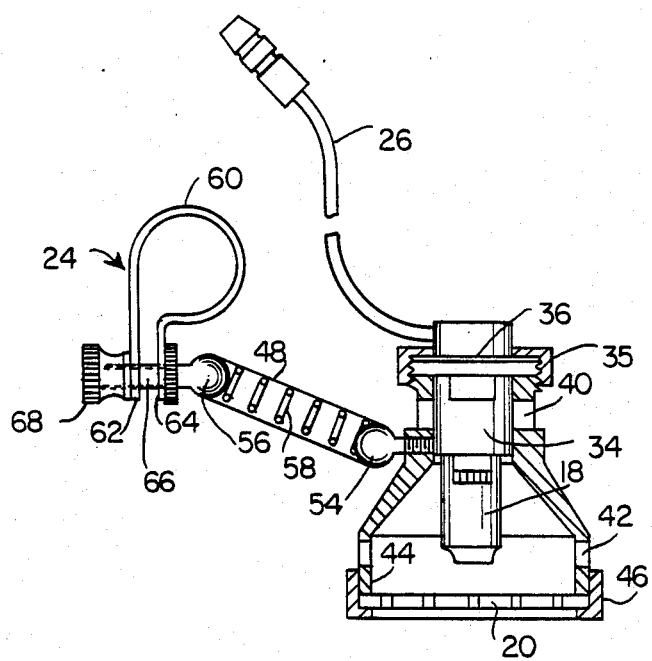
FIG. 3 is a view partly in section of the assembled light.

The shock absorbing swivel base 22 is best shown in FIGS. 2 and 3. The base comprises an elongated tubular handle-like member 48 having opposite ends 50 and 52 of a reduced size and fitted around toggles or ball joints 54 and 56. The ball joint 54 is connected by a threaded shaft 55 to the light reflector while ball joint 56 is connected to the clamp 24. An internal spring 58 biases the ball joints against the opposite ends of the handle-like member 48. The ball joint fittings provide a universal-like movement in order that the light may be swivelled to position the high intensity beam as desired. The handle-like member 48 may be grasped when the light and reflector are hot to position the lights as desired. The shock absorbing spring permits the swivelling movement while providing relief against physical impact when the gun is moved about in contact with the workpiece and other objects. Such relief prolongs the lift of the tungsten filament of the light which is susceptible to damage by physical shock.

The clamp 24 as shown in FIGS. 2 and 3 has a circular hoop portion 60 which fits about the barrel 12 of the MIG gun. Extensions 62 and 64 are provided with holes about which a threaded shaft 66 of ball joint 56 are fitted. Tightening is effected by thumb nut 68.

USE

The light 10 of this invention is very simply employed with standard MIG welding guns. The attachment to the gun 14 by the clamp 22 is very easily effected by slipping the hoop 60 over the barrel and tightening the thumb nut. The light is then ready for use.

Positioning or focusing of the light is provided by grasping either or both of the reflector or swivel base and moving as desired. Should the intensity of the light beam be desired to be changed to sharp or divergent the shims 47 may be increased or decreased.

In use the compact light 10 withstands and minimizes transmission of shock and vibration to the small high efficiency low voltage quartz halogen bulb that produces the extreme brilliant white light that is focused by the fixture's unique parabolic design to a small focal point. The reflected light approaches the intensity of the user's own arc and through the reflector holes 40 and 42 provides a system for ventilating while protecting the bulb from heat and cold impact. The shock absorbing flexible swivel base mounting allows it to be easily moved to accommodate either a right or left handed operator, or its position varied as space and working conditions dictate. It can be powered by its own transformer power supply or by the MIG welders own conventional transformer so adapted to low voltage.

The quartz halogen welding light bulb 18 is primarily adapted to overcome the #10 welding shield and give visibility to the operator who is otherwise in total darkness between welds. Customarily MIG welds were long heavy continuous welds, and the dark shield was lifted between welds to locate the site of the next weld. It is now in many jurisdictions a legal and structural necessity to use MIG welding equipment when repairing the high strength alloy steel, i.e. HSLA, used in late model cars. However, this HSLA steel requires short stagered welds over irregular hard to reach surfaces and in places where it is all but impossible to raise the dark cumbersome shield. The small wire (0.025 & 0.030) and low heat setting used in this type of welding produces a small short arc which gives very poor peripheral lighting making it difficult to see beyond the molten pool itself.

The quartz halogen welding light eliminates the time consuming practice of always having to lift the shield between welds and also improves visibility while welding. The hand that used to be busy lifting the shield can now be put to some constructive task such as holding the work in place, or by the user holding himself in place. Since the user's orientation and balance are always being tested while under the dark cumbersome shield, the added ability of being able to hold on and to see what he is about to grab hold of is an important safety feature. Another important safety feature is that accidental flash burns to the eyes while maneuvering the gun with the shield up are eliminated, since the user is now able to move from weld to weld without having to raise his shield. Going from daylight to dark, to bright shielded arc, to dark and back to daylight, and rapidly repeating the whole cycle over and over again without giving the eye adequate time to adjust to any one condition is very tiring. The light intensity varies only slightly when using the quartz halogen welding light which provides a substantial aid and comfort to the user's eyes.

Various changes and modifications may be made within this invention as will be apparent to those skilled in the art. Such changes and modifications are within the scope and teaching of this invention as defined in the claims appended hereto.

What is claimed is:

1. A light for a MIG welding gun having a barrel, said light comprising means for attachment to said gun barrel, a low voltage halogen light bulb having an intensity sufficient to provide visibility through a MIG welding helmet, said bulb being mounted in a parabolic reflector, swivel means for mounting said parabolic reflector for focusing adjustment of said reflector and bulb with respect to said gun barrel and spring biased shock resistant means supporting said swivel means, said swivel means comprising an elongated handle member connected by separate ball joint members to said reflector and the means for attachment to said gun barrel to provide a universal movement at opposite ends of said handle member, said handle member being tubular and having said opposite ends fitted over said ball joint members and said spring biased shock resistant means comprising a spring fitted inside said handle member and biased at opposite ends in socket against said ball joint members.

2. The light of claim 1 in which means are provided for adjusting said bulb within said reflector to vary the focus of the light.

3. The light of claim 1 in which the means for attachment to the barrel of the gun comprises a hoop member fittable over the barrel and means for tightening said hoop member about the barrel.

4. The light of claim 3 in which said means for tightening the hoop member about the barrel comprises a threaded shaft connected to one of the ball joints extending through extensions of said hoop member and means for closing said extensions together about said threaded shaft.

5. The light of claim 1 in which said reflector has a socket receiving a base of said bulb and means for longitudinally shifting the position of the base within said socket to vary the focus of the bulb within the parabolic reflector.

6. The light of claim 5 in which the base of said bulb has a flange fitting over an end of said socket and the means for shifting the position fo the bulb comprises selected shims fitting between said flange and the end of the socket.

7. A light for a MIG welding gun having a barrel, said light comprising means for attachment to said gun barrel, a low voltage halogen light bulb having an intensity sufficient to provide visibility through a MIG welding helmet, said bulb being mounted on a parabolic reflector, swivel means for mounting said parabolic reflector for focusing adjustment of said reflector and bulb with respect to said gun barrel and spring biased shock resistant means supporting said swivel means, said swivel means comprising an elongated handle member connected by separated ball joint members to said reflector and the means for attachment to said gun barrel to provide a universal movement at opposite ends of said handle member, the reflector having a lens fitting over a light emitting front of the reflector, said lens being comprised of a metallic screen to protect against spatter and dissipate heat from the bulb and said reflector having openings for dissipation of heat from the bulb.

8. The light of claim 7 in which the reflector has a socket receiving a base of the bulb and the openings in the reflector for dissipation of heat comprise socket openings and openings in the reflector adjacent the lens.

9. The light of claim 7 in which the metallic screen is of woven tungsten wire.

* * * * *